United States Patent [19]

Schäfer et al.

[11] Patent Number: 4,496,472

[45] Date of Patent: Jan. 29, 1985

[54] PROCESS FOR BLEACHING CELLULOSIC FIBRE MATERIALS USING OLIGOMERS OF PHOSPHONIC ACID ESTERS AS STABILIZERS IN ALKALINE, PEROXIDE-CONTAINING BLEACHING LIQUORS

[75] Inventors: Paul Schäfer, Riehen; Hans-Ulrich Berendt, Allschwil, both of Switzerland

[73] Assignee: Ciba Geigy Corporation, Ardsley, N.Y.

[21] Appl. No.: 450,718

[22] Filed: Dec. 17, 1982

[30] Foreign Application Priority Data

Dec. 23, 1981 [CH] Switzerland ........................ 8299/81

[51] Int. Cl.$^3$ .......................... C09K 3/00; D06L 3/02

[52] U.S. Cl. .......................... 252/186.22; 252/186.21; 252/186.28; 252/186.29

[58] Field of Search ...................... 252/186.21, 186.22, 252/186.27, 186.28, 186.29, 99, 103; 8/111, 107

[56] References Cited

U.S. PATENT DOCUMENTS

| | | | |
|---|---|---|---|
| 3,122,417 | 2/1964 | Blaser et al. | 252/186.29 X |
| 3,542,918 | 11/1970 | Berth et al. | 8/111 X |
| 3,562,169 | 2/1971 | Prentice | 252/545 |
| 3,621,081 | 11/1971 | Prentice | 252/545 X |
| 3,740,187 | 6/1973 | Kowalski | 252/186.29 X |
| 3,795,625 | 3/1974 | Kowalski | 252/186.27 X |
| 4,077,997 | 3/1978 | Blum et al. | 252/175 X |
| 4,190,615 | 2/1980 | Becker | 260/931 |
| 4,254,063 | 3/1981 | Becker | 260/931 |
| 4,263,160 | 4/1981 | Morse | 252/99 X |
| 4,323,465 | 4/1982 | Downey et al. | 252/102 |

FOREIGN PATENT DOCUMENTS 927617 5/1963 United Kingdom .

*Primary Examiner*—Ben R. Padgett
*Assistant Examiner*—Matthew A. Thexton
*Attorney, Agent, or Firm*—Edward McC. Roberts

[57] ABSTRACT

Oligomers of the formula

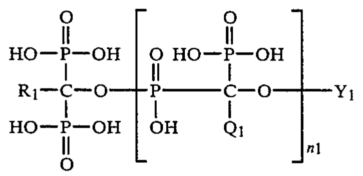

wherein $Y_1$ is hydrogen or —CO—$T_1$, $R_1$ $Q_1$ and $T_1$ are alkyl and $n_1$ is 1 to 16, or alkali metal salts thereof, are used as stabilizers in peroxide-containing alkaline liquors for bleaching cellulosic fibre materials.

23 Claims, No Drawings

PROCESS FOR BLEACHING CELLULOSIC FIBRE MATERIALS USING OLIGOMERS OF PHOSPHONIC ACID ESTERS AS STABILIZERS IN ALKALINE, PEROXIDE-CONTAINING BLEACHING LIQUORS

The present invention relates to a process for bleaching cellulosic fibre materials with aqueous peroxide-containing alkaline liquors, which process comprises applying to said materials liquors which are stabilised by the addition of water-soluble oligomers of the formula

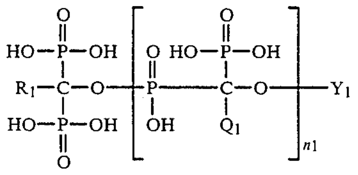
(1)

wherein $Y_1$ is hydrogen or —CO—$T_1$, each of $R_1$, $Q_1$ and $T_1$ is $C_1$–$C_4$ alkyl, and $n_1$ is 1 to 16, or alkali metal salts thereof, and subsequently storing said fibre materials in the moist state.

The present invention also relates to the use of the oligomers of the formula (1) as stabilisers for aqueous peroxide-containing alkaline liquors for bleaching cellulosic fibre materials, to the bleaching liquor for carrying out the bleaching process and stabilised with the oligomers of the formula (1), as well as to the cellulosic fibre material which is bleached by the bleaching process.

The water-soluble compounds of the formula (1) are preferably in the form of alkali metal salts, in particular of sodium salts and, most particularly, of potassium salts. Both all and only some of the hydrogen atoms of the —$P(O)(OH)_2$ and —P(O)(OH) groups may be substituted by alkali metal atoms.

Suitable alkyl radicals $R_1$, $Q_1$ and $T_1$ are isobutyl, preferably isopropyl, in particular n-butyl and n-propyl and, most particularly, ethyl and methyl, with methyl being most preferred.

Where $Y_1$ is —CO—$T_1$, it is preferred that $T_1$ and $R_1$ have the same meanings. The preferred meaning of $Y_1$, however, is hydrogen. The preferred values for $n_1$ are 1 to 16, in particular 1 to 12; but, in admixture, oligomers in which the average values for n are from about 5 to 9, preferably about 5 or 6, form the main constituent. However, oligomers in which n is 1 and oligomers in which n is a value from 12 to 16, preferably 12, are always present in smaller amounts in the mixture.

It is preferred to use oligomers of the formula

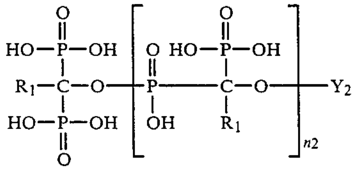
(2)

wherein $Y_2$ is hydrogen or —CO—$R_1$, $n_2$ is a value from 1 to 14 and $R_1$ is as previously defined, or the sodium or potassium salts thereof, and, in particular, oligomers of the formula

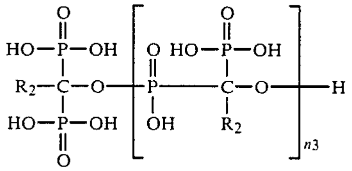
(3)

wherein $R_2$ is methyl or ethyl and $n_3$ is a value from 1 to 12, or the potassium salts thereof.

The oligomers of the formula (1), their preparation and their use as reverse emulsion breakers, scale control agents and auxiliaries in paper manufacture, are described e.g. in U.S. Pat. No. 4,254,063 and in European patent application No. 0 029 076. In the known preparatory methods, the oligomers are obtained in the form of their free phosphonic acids. However, it is advantageous to convert the oligomers, before their use in the bleaching liquors of this invention, at least partially into their alkali metal salts. This is ordinarily accomplished by adding an alkali metal hydroxide, e.g. sodium hydroxide or, preferably, potassium hydroxide, to the aqueous acid solutions of the oligomers obtained by the known methods. The procedure is that e.g. sodium hydroxide, or preferably potassium hydroxide, preferably in the form of its aqueous solution, is added to the acid solution of the oligomers such that the pH of the solution rises to 3 to 7, preferably to 3.5 to 4. Owing to their greater solubility, the potassium salts of the oligomers are preferred to the sodium salts.

The oligomers of the formula (1) may also be used in the bleaching liquors of this invention in combination with other stabilisers such as the aminoalkanediphosphonic acids disclosed in German Pat. specification Nos. 2 625 767 or 2 115 737.

The process of this invention for bleaching cellulosic fibre materials using the oligomers of the formula (1) for stabilising the aqueous peroxide-containing alkaline liquors, is carried out by first applying the bleaching liquors to the fibre material, usually e.g. by immersion and preferably by padding at e.g. 10° to 60° C., but preferably at room temperature (15° to 25° C.), and expressing the material to a liquor pickup of about 50 to 120% by weight, preferably 90 to 110% by weight. After the fibre material has been impregnated, it is usually subjected, without being dried and while still wet, or after being squeezed in the pad method and while still moist, to a so-called wet storage treatment, in which the material is rolled up and, optionally, packed in a plastic sheet and subsequently stored under pressure or under normal pressure at a maximum temperature of 150° C. for about 10 minutes, but preferably under normal pressure at 80° C. to 98° C. for about 1 to 5 hours or, most preferably, at room temperature (15° to 25° C.) for about 10 to 30 hours.

The treatment of the fibre material can also, however, be carried out in so-called long liquors (exhaust method) at a liquor ratio of e.g. 1:3 to 1:100, preferably 1:8 to 1:25, and preferably at 80° to 98° C. Optionally, however, exhaustion can also be performed at 150° C. under pressure in so-called high-temperature (HT) apparatus. If bleaching is carried out by the exhaust method, the fibre material is treated in the indicated temperature ranges and over the indicated periods of time in the apparatus employed for the exhaust method, e.g. in a winch beck.

In plant operation, continuous processes in which similar dwell times for the fibre material in the bleaching liquor at the indicated temperatures are necessary, are of particular importance.

Treatment temperatures of 98° C. are advantageously not exceeded in order to avoid damage to the fabric. When using special HT (high temperature) machines, however, the fibre materials can also be treated in industrial continuous methods under pressure up to e.g. 2.5 bar at higher temperatures, e.g. up to 150° C., provided the treatment time is kept so short that damage to the fabric is ruled out.

Subsequently the fibre materials are usually rinsed thoroughly first with hot water of about 90° to 98° C. and then with cold water, optionally neutralised e.g. with acetic acid, and then dried, preferably at elevated temperature (e.g. up to 150° C.).

The bleaching liquors (aqueous solutions) of this invention normally contain:

(a) an alkali metal hydroxide,
(b) hydrogen peroxide,
(c) oligomers of the formula (1) and, optionally, as further ingredients
(d) a peroxidisulfate,
(e) a wetting agent,
(f) an antifoam and/or a deaerating agent,
(g) a water-soluble alkali metal salt of a silicate and/or
(h) a fluorescent whitening agent.

As obligatory components (a) and (b), potassium hydroxide and, in particular, the cheaper sodium hydroxide, and hydrogen peroxide, are used preferably in the form of their aqueous, preferably concentrated solutions (about 30 to 35% by weight). However, component (a) can also be used as solid, e.g. pure sodium hydroxide.

The preferred optional component (d) is an alkali metal peroxide sulfate, in particular sodium peroxidisulfate ($Na_2S_2O_8$), which is preferably used as a solid as such.

Wetting agents suitable for use as component (e) are both anionic and non-ionic surfactants, especially mixtures thereof. Examples of preferred anionic surfactants are alkylarylsulfonates, fatty acid condensates, products of proteolysis or salts thereof, and, in particular, alkylsulfate salts and alkylbenzenesulfonic acids containing 12 to 22 carbon atoms in the alkyl moiety. Preferred non-ionic surfactants are e.g. adducts of alkylene oxides, especially propylene oxide and, most particularly, ethylene oxide, with alkyl phenols containing e.g. 4 to 12 carbon atoms in the alkyl moiety, preferably fatty acid amides and, most preferably, fatty alcohols, the adducts of ethylene oxide and fatty alcohols being particularly preferred and of particular interest in admixture with the alkylsulfates and alkylbenzenesulfonic acids of the indicated kind. Further suitable components in these mixtures are silicone surfactants and silicone oils.

The preferred optional component (f) is a higher alcohol, e.g. isooctyl alcohol, and in particular a silicone-based antifoam and/or deaerator, most preferably a silicone oil emulsion.

Components (e) and (f) are preferably combined with commercially available aqueous formulations of non-foaming surfactant mixtures having a concentration of about 10 to 60% by weight, preferably of 30 to 40% by weight.

The preferred optional component (g) is e.g. a water-soluble alkali metal silicate, especially sodium silicate or sodium water glass having an $SiO_2$ content of 24 to 28%, preferably in the form of an aqueous solution having a concentration of about 30 to 40% by weight.

The fluorescent whitening agents employed as optional component (h) belong in general to the styryl and stilbene series, e.g. distyrylarylenes, diaminostilbenes, ditriazolylstilbenes, phenylbenzoxazolylstilbenes, stilbenenaphthotriazoles and dibenzoxazolylstilbenes. Preferred fluorescent whitening agents are those of the distyrylbiphenyl or bistriazinylaminostilbene type which contain sulfonic acid groups, e.g. sulfonated distyrylbiphenyl and bistriazinyl derivatives, in particular the bis(phenylaminodialkylamino-s-triazinyl)stilbenedisulfonic acids and bis(phenylamino-morpholino-s-triazinyl)stilbenedisulfonic acids which are in the form of alkali metal salts, preferably potassium salts and, most preferably, sodium salts. These fluorescent whitening agents are preferably employed in the form of commercially available aqueous liquid formulations having a concentration of about 20 to 30% by weight.

If the bleaching liquors are used in the continuous process, it may be necessary to prepare treatment liquors of 3 to 5 times greater concentration in the form of feed or stock baths in order to compensate for the loss in concentration of the bleaching bath after a certain quantity of material has been bleached.

Taking into account their possible concentration, e.g. 5-fold concentration, the bleaching liquor will usually contain:

0.02 to 10% (0.2 to 100 g/l) of component (a),
0.05 to 12% by weight (1.4 to 343 g/l) of component (b),
0.02 to 4% by weight (0.6 to 114 g/l) of component (c),
0 to 5% by weight (0 to 50 g/l) of component (d),
0 to 2.5% by weight (0 to 50 g/l) of component (e),
0 to 0.05% by weight (0 to 10 g/l) of component (f),
0 to 1.5% by weight (0 to 42.8 g/l) of component (g), and
0 to 0.8% by weight (0 to 32 g/l) of component (h), the percentages being in each case based on the weight of active ingredient of components (a) to (h). In this connection, it is implicit in the indicated amount of component (a) that component (c) is present in the form of an alkali metal salt of an oligomer of formula (1). If component (c) is only partially in the form of a salt or is in the form of the free acid, the amount of component (a) will be correspondingly increased.

The bleaching liquor will preferably contain:

0.02 to 10% by weight (0.2 to 100 g/l) of component (a),
0.05 to 12% by weight (1.4 to 343 g/l) of component (b),
0.02 to 1.2% by weight (0.6 to 34 g/l) of component (c),
0 to 5% by weight (0 to 50 g/l) of component (d),
0 to 0.4% by weight (0 to 8 g/l) of component (e),
0 to 0.01% by weight (0 to 2 g/l) of component (f),
0 to 0.6% by weight (0 to 17 g/l) of component (g) and
0 to 0.8% by weight (0 to 32 g/l) of component (h), or also 0.02 to 10% by weight (0.2 to 100 g/l) of component (a),
0.05 to 10.5% by weight (1.4 to 300 g/l) of component (b),
0.07 to 4% by weight (2 to 34 g/l) of component (c),
0 to 3% by weight (0 to 30 g/l) of component (d), 0 to 2.5% by weight (0 to 8 g/l) of component (e),
0 to 0.05% by weight (0 to 2 g/l) of component (f),
0 to 1.5% by weight (0 to 17 g/l) of component (g) and
0 to 0.8% by weight (0 to 32 g/l) of component (h).

In order to effect a better wetting and penetration of the material with the bleaching liquor, while avoiding an undesirable foam formation, it is advantageous to use optional component (e), preferably in combination with component (f), in commercial formulations, together with the obligatory components (a), (b) and (c) in the bleaching liquor. Taking into account also their possible 5-fold concentration, such preferred bleaching liquors contain:

0.02 to 10% by weight (0.2 to 100 g/l) of component (a),
0.05 to 12% by weight (1.4 to 343 g/l) of component (b),
0.02 to 4% by weight (0.6 to 114 g/l) of component (c),
0.005 to 0.2% by weight (0.1 to 4 g/l) of component (e),
0.0001 to 0.005% by weight (0.02 to 1 g/l) of component (f).

This bleaching liquor preferably contains:

0.02 to 10% by weight (0.2 to 100 g/l) of component (a),
0.05 to 12% by weight (1.4 to 343 g/l) of component (b),
0.02 to 1.2% by weight (0.6 to 34 g/l) of component (c),
0.005 to 0.2% by weight (0.1 to 4 g/l) of component (e) and
0.0001 to 0.005% by weight (0.02 to 1 g/l) of component (f), or also 0.02 to 10% by weight (0.2 to 100 g/l) of component (a),
0.05 to 10.5% by weight (1.4 to 300 g/l) of component (b),
0.07 to 4% by weight (2 to 34 g/l) of component (c),
0.005 to 0.2% by weight (0.1 to 4 g/l) of component (e) and
0.0001 to 0.005% by weight (0.02 to 1 g/l) of component (f).

In addition to components (a), (b) and (c) or (a), (b), (c), (e) and (f), one or two of the further optional components (d), (g) or (h) or all three optional components (d), (g) and (h) may be used. Such bleaching liquors, which may be e.g. 5 times more concentrated than the treatment bath, accordingly contain, in addition to the cited components, 0.2 to 5% by weight (2 to 50 g/l) of component (d),
0.05 to 1.5% by weight (1.4 to 42.8 g/l) of component (g)

and/or 0.1 to 0.8% by weight (4 to 32 g/l) of component (h), or preferably 0.2 to 5% by weight (2 to 50 g/l) of component (d),
0.05 to 0.6% by weight (1.4 to 17 g/l) of component (g), and/or 0.1 to 0.8% by weight (4 to 32 g/l) of component (h), or also 0.2 to 3% by weight (2 to 30 g/l) of component (d),
0.05 to 1.5% by weight (1.4 to 42.8 g/l) of component (g), and/or 0.1 to 0.8% by weight (4 to 32 g/l) of component (h).

Summarizing the above, particularly useful bleach liquors contain:

0.02 to 10% (0.2 to 100 g/l) of component (a),
0.05 to 10.5% by weight (1.4 to 300 g/l) of component (b),
0.02 to 4% by weight (0.6 to 114 g/l) of component (c),
0 to 3% by weight (0 to 30 g/l) of component (d),
0 to 2.5% by weight (0 to 50 g/l) of component (e),
0 to 0.05% by weight (0 to 10 g/l) of component (f),
0 to 1.5% by weight (0 to 42.8 g/l) of component (g), and
0 to 0.8% by weight (0 to 32 g/l) of component (h), or 0.02 to 10% (0.2 to 100 g/l) of component (a),
0.05 to 12% by weight (1.4 to 343 g/l) of component (b),
0.02 to 4% by weight (0.6 to 114 g/l) of component (c),
0 to 5% by weight (0 to 50 g/l) of component (d),
0.005 to 0.2% by weight (0.1 to 4 g/l) of component (e),
0.0001 to 0.005% by weight (0.02 to 1 g/l) of component (f),
0 to 1.5% by weight (0 to 42.8 g/l) of component (g), and
0 to 0.8% by weight (0 to 32 g/l) of component (h), or 0.02 to 10% (0.2 to 100 g/l) of component (a),
0.05 to 12% by weight (1.4 to 343 g/l) of component (b),
0.02 to 1.2% by weight (0.6 to 34 g/l) of component (c),
0 to 5% by weight (0 to 50 g/l) of component (d),
0.005 to 0.2% by weight (0.1 to 4 g/l) of component (e),
0.0001 to 0.005% by weight (0.02 to 1 g/l) of component (f),
0 to 1.5% by weight (0 to 42.8 g/l) of component (g), and
0 to 0.8% by weight (0 to 32 g/l) of component (h), or 0.02 to 10% (0.2 to 100 g/l) of component (a),
0.05 to 10.5% by weight (1.4 to 300 g/l) of component (b),
0.07 to 4% by weight (2 to 114 g/l) of component (c),
0 to 5% by weight (0 to 50 g/l) of component (d),
0.005 to 0.2% by weight (0.1 to 54 g/l) of component (e),
0.0001 to 0.005% by weight (0.02 to 1 g/l) of component (f),
0 to 1.5% by weight (0 to 42.8 g/l) of component (g), and
0 to 0.8% by weight (0 to 32 g/l) of component (h), or 0.02 to 10% (0.2 to 100 g/l) of component (a),
0.05 to 12% by weight (1.4 to 343 g/l) of component (b),
0.02 to 4% by weight (0.6 to 114 g/l) of component (c),
0.2 to 5% by weight (2 to 50 g/l) of component (d),
0 to 2.5% by weight (0 to 50 g/l) of component (e),
0 to 0.05% by weight (0 to 10 g/l) of component (f),
0.05 to 1.5% by weight (1.4 to 42.8 g/l) of component (g), and/or
0.1 to 0.8% by weight (4 to 32 g/l) of component (h), or 0.02 to 10% (0.2 to 100 g/l) of component (a),
0.05 to 12% by weight (1.4 to 343 g/l) of component (b),
0.02 to 4% by weight (0.6 to 114 g/l) of component (c),
0.2 to 5% by weight (2 to 50 g/l) of component (d),
0.005 to 0.2% by weight (0.1 to 4 g/l) of component (e),
0.0001 to 0.005% by weight (0.02 to 1 g/l) of component (f),
0.05 to 0.6% by weight (1.4 to 17 g/l) of component (g), and/or
0.1 to 0.8% by weight (4 to 32 g/l) of component (h), or 0.02 to 10% (0.2 to 100 g/l) of component (a),
0.05 to 12% by weight (1.4 to 343 g/l) of component (b),
0.02 to 4% by weight (0.6 to 114 g/l) of component (c),
0.2 to 5% by weight (2 to 50 g/l) of component (d),
0 to 2.5% by weight (0 to 50 g/l) of component (e),
0 to 0.05% by weight (0 to 10 g/l) of component (f),
0.05 to 0.6% by weight (1.4 to 17.1 g/l) of component (g), and/or
0.1 to 0.8% by weight (4 to 32 g/l) of component (h), or 0.02 to 10% (0.2 to 100 g/l) of component (a),
0.05 to 12% by weight (1.4 to 343 g/l) of component (b),
0.02 to 4% by weight (0.6 to 114 g/l) of component (c),
0.2 to 3% by weight (2 to 30 g/l) of component (d),
0 to 2.5% by weight (0 to 50 g/l) of component (e),
0 to 0.05% by weight (0 to 10 g/l) of component (f),
0.05 to 1.5% by weight (1.4 to 42.8 g/l) of component (g), and/or
0.1 to 0.8% by weight (4 to 32 g/l) of component (h), the percentages being in each case based on the weight of active ingredient of components (a) to (h). In this connection, it is implicit in the indicated amount of component (a) that component (c) is present in the form of an alkali metal salt of an oligomer of formula (1). If component (c) is only partially in the form of a salt or is in the form of the free acid, the amount of component (a) will be corrrespondingly increased.

The non-concentrated bleaching liquor with which the material is impregnated, i.e. the actual bleaching bath, ordinarily contains;

0.02 to 2% by weight, preferably 0.06 to 1.8% by weight (0.2 to 20 g/l, preferably 0.6 to 18 g/l) of component (a),
0.05 to 2.4% by weight, preferably 0.1 to 2% by weight (1.4 to 68.6 g/l, preferably 2.8 to 57.2 g/l) of component (b),
0.02 to 0.80% by weight, preferably 0.03 to 0.77% by weight (0.57 to 22.8 g/l, preferably 0.85 to 22 g/l) of component (c),
0 to 1% by weight, preferably 0.2 to 0.8% by weight (0 to 10 g/l, preferably 2 to 8 g/l) of component (d),
0 to 0.50% by weight, preferably 0.005 to 0.25% by weight (0 to 10 g/l, preferably 0.1 to 5 g/l) of component (e),
0 to 0.01% by weight, preferably 0.0001 to 0.005% by weight (0 to 2 g/l, preferably 0.02 to 1 g/l) of component (f),
0 to 0.30% by weight, preferably 0.05 to 0.20% by weight (0 to 8.6 g/l, preferably 1.4 to 5.7 g/l) of component (g) and
0 to 0.16% by weight, preferably 0.1 to 0.16% by weight (0 to 6.4 g/l, preferably 4 to 6.4 g/l) of component (h).

This bleaching liquor preferably contains:

0.02 to 2% by weight, preferably 0.06 to 1.8% by weight (0.2 to 20 g/l, preferably 0.6 to 18, g/l) of component (a),
0.05 to 2.4% by weight, preferably 0.1 to 2% by weight (1.4 to 68.6 g/l preferably 2.8 to 57.2 g/l) of component (b),
0.02 to 0.24% by weight, preferably 0.03 to 0.77% by weight (0.57 to 6.8 g/l, preferably 0.85 to 22 g/l) of component (c),
0 to 1% by weight, preferably 0.2 to 0.8% by weight (0 to 10 g/l, preferably 2 to 8 g/l) of component (d),
0 to 0.08% by weight, preferably 0.005 to 0.25% by weight (0 to 1.6 g/l, preferably 0.1 to 5 g/l) of component (e),
0 to 0.002% by weight, preferably 0.0001 to 0.005% by weight (0 to 0.4 g/l, preferably 0.02 to 1 g/l) of component (f),
0 to 0.12% by weight, preferably 0.05 to 0.10% by weight (0 to 3.4 g/l, preferably 1.4 to 2.9 g/l) of component (g) and
0 to 0.16% by weight, preferably 0.1 to 0.16% by weight (0 to 6.4 g/l, preferably 4 to 6.4 g/l) of component (h), or also 0.02 to 2% by weight, preferably 0.06 to 1.8% by weight (0.2 to 20 g/l preferably 0.6 to 18 g/l) of component (a),
0.05 to 2.1% by weight, preferably 0.1 to 1.5% by weight (1.4 to 60 g/l preferably 2.8 to 42.8 g/l) of component (b),
0.07 to 0.80% by weight, preferably 0.1 to 0.7% by weight (1.9 to 22.8 g/l, preferably 2.8 to 20 g/l) of component (c),
0 to 0.6% by weight, preferably 0.2 to 0.4% by weight (0 to 6 g/l, preferably 2 to 4 g/l) of component (d),
0 to 0,5% by weight, preferably 0.005 to 0.25% by weight (0 to 10 g/l preferably 0.1 to 5 g/l) of component (e),
0 to 0.01% by weight, preferably 0.0001 to 0.005% by weight (0 to 2 g/l, preferably 0.02 to 1 g/l) of component (f),
0 to 0.30% by weight, preferably 0.05 to 0.20% by weight (0 to 8.5 g/l preferably 1.4 to 5.7 g/l) of component (g) and
0 to 0.16% by weight, preferably 0.1 to 0.16% by weight (0 to 6.4 g/l, preferably 4 to 6.4 g/l) of component (h).

The cellulosic material which is bleached by the process of this invention may be in the most widely different stages of processing, e.g. loose stock, yarn, fabrics or knits. These materials are accordingly as a rule always textile fibre materials which are obtained from pure cellulose fibres or from blends of textile cellulose fibres with textile synthetic fibres.

Examples of cellulosic fibres are those made from regenerated cellulose such as staple fibre and vicose, those of natural cellulose, e.g. hemp, linen and jute and, in particular, cotton, while synthetic fibres are acrylic fibres and, in particular, polyester and polyamide fibres.

Fabrics of cotton or regenerated cellulose or blends of cotton and polyester and of cotton and polyamide are particularly suitable for bleaching by the process of this invention. Cotton woven and knitted fabrics are preferred. Materials which have been prewashed with e.g. surfactants are also suitable. It is also possible to bleach sized cotton fibres, in which case bleaching may be carried out after or before desizing.

The fibre materials bleached by the process of this invention are free from husks, have good rewettability, a low ash content and, in particular, a high degree of whiteness. No damage or no substantial decrease in the degree of polymerisation is observed in the cellulose or cellulose component of the bleached material. The use of the mixtures of formula (1) effects a particularly good stabilisation even of liquors which have a concentration several times, e.g. five times, greater than the actual treatment bath. The content of active oxygen originally present in the bleaching liquors is retained for some time (e.g. up to 5 days) or decreases only insignificantly (e.g. by 10% at most). In addition, silicates (water glass) are not required, or are required only in small amounts, in the bleaching liquors owing to the presence of the mixtures of formula (1) as stabilisers, so that scarcely any or no incrustation occurs in the bleaching apparatus or on the bleached fibre material.

The stabilising action of the compounds of the formula (1) employed in the practice of this invention is markedly superior to the action of known stabilisers used hitherto in bleaching liquors.

The invention is illustrated by the following Examples, in which parts and percentages are by weight, unless indicated to the contrary.

MANUFACTURING INSTRUCTIONS

Preparation of oligomers in accordance with Example 12 of U.S. Pat. No. 4,254,063

A. 137.5 parts (1 mole) of phosphorus trichloride are added at 20°-25° C. over 75 minutes to a mixture of 90 parts (1.5 moles) of glacial acetic acid and 27 parts (1.5 moles) of water. During the addition of the first third of the amount of phosphorus trichloride it is necessary to cool the reaction mixture (evolution of HCl), whilst towards the end of the addition the reaction becomes endothermic and the mixture has to be heated in order to maintain HCl evolution. When the addition of phosphorus trichloride is complete, the inhomogeneous reaction mixture is then heated to 125° C. over 120 minutes and kept for 2 hours at this temperature. The reaction mixture is then in the form of a completely homogeneous clear melt. This melt is then cooled to 80° C. and kept for 1 hour under reduced pressure (−25 to −15 bar) during which time about 10 parts of by-product are removed from the reaction mixture. The melt is then adjusted to pH 3.5 at 20° C. with 20% aqueous potassium hydroxide solution and thereafter diluted with water to give 420 parts of an aqueous, clear, colourless solution which contains 35% of oligomers of the formula

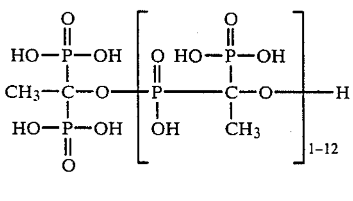
(4)

as partial potassium salt.

B. 45 parts of glacial acetic acid, 13.5 parts of water and 68.8 parts of phosphorus trichloride are reacted as in (A). When the addition of phosphorus trichloride is complete, the reaction temperature is raised to 125° C. and kept for 1 hour. The reaction mixture is then cooled to 80° C. and 125 parts of acetic anhydride are added. This mixture is then allowed to stand for 2 hours without further heating and the precipitated reaction product is isolated by filtration, washed with ether and dried in vacuo at 50° C. The dried product is dissolved in 50 parts of water, to give 100 parts of a colourless, clear solution with contains 50% of oligomers of the formula

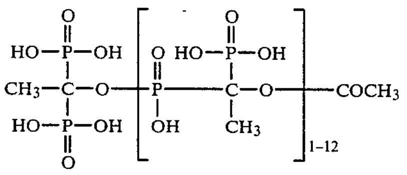
(5)

C. 55.5 parts of propionic acid, 13.5 parts of water and 68.8 parts of phosphorus trichloride are reacted as in (A). When the addition of phosphorus trichloride is complete, the reaction temperature is raised to 125° C. and kept for 1 hour. The reaction mixture is then cooled to 80° C. and the mixture is kept under reduced pressure (−25 to −15 bar), while about 10 parts of by-product are removed. The solid residue is dissolved in 110 parts of water and the pH-value is adjusted to 3.5 with 98.7 parts of 30% potassium hydroxide solution, affording 265 parts of a yellowish solution which contains 35% of oligomers of the formula

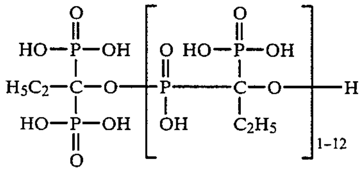
(6)

as partial potassium salt.

D. The procedure of (A) is repeated, except that the pH-value of the aqueous solution is adjusted to 3.5 with 30% aqueous sodium hydroxide solution, to give a colourless solution which contains 35% of oligomers of the formula

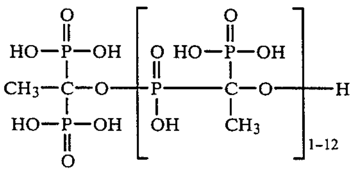
(7)

as partial sodium salt.

E. The procedure of (A) is repeated without the addition of potassium hydroxide, to give a solution which contains 35% of oligomers of the formula

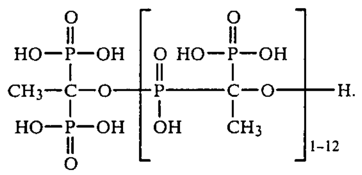

(8)

EXAMPLES

EXAMPLE 1

Unbleached cotton fabric is impregnated with an aqueous liquor which contains per liter or kg 12 g of sodium hydroxide
40 ml (45.3 g) of a 35% aqueous solution of hydrogen peroxide
1.5 g of a 25% aqueous surfactant solution consisting of 56% of a $C_{12}$–$C_{22}$ alkylbenzenesulfonic acid, 25% of adducts of technical $C_{12}$–$C_{22}$ fatty alcohol mixtures with ethylene oxide and 19% of sodium $C_{12}$–$C_{22}$ alkylsulfate,
0.15 g of a 5% aqueous silicone oil emulsion and
6 g of a 35% aqueous solution of oligomers of formula (4) obtained according to (A).

The fabric is squeezed out to a pickup of 100%. Instead of the 25% aqueous surfactant solution, it is also possible to use as further surfactants 5 g of a 48% aqueous surfactant solution of pentadecane-1-sufonic acid (sodium salt) and the adduct of 4 moles of ethylene oxide with 1 mole of a primary $C_9$–$C_{11}$ alcohol in the weight ratio of 3:1. The impregnated fabric is rolled up and stored wet for 24 hours at room temperature (15°–25° C.). The fabric is then thoroughly rinsed first with hot water of 90°–98° C. and then with cold water of 5°–25° C. and subsequently dried. The increase in whiteness of the bleached fabric compared with the untreated fabric before bleaching is determined in accordance with the CIBA-GEIGY Whiteness Scale (see R. Griesser, "Tenside Detergents", 12 [2], 93–100 (1975)]. The value obtained for the untreated fabric is −62, compared with 56 for the bleached fabric. The average degree of polymerisation of the cellulose of the bleached and unbleached fabric is in each case 2400 in accordance with SNV 195 598. Accordingly, the bleaching has caused no decrease in the average degree of polymerisation, i.e. no damage to the cotton. The ash content (incineration at 8000° C. for 2 hours) of the bleached fabric is only 0.30%. In addition, the bleached fabric is free from husks and has excellent rewettability. In continuous bleaching, a bleaching bath used as feed or stock bath and having a concentration 5 times greater than the normal treatment bath has a content of active oxygen (measured by reacting the active oxygen with an excess of arsenite solution and subsequent iodometric determination of unreacted excess arsenite) of 97.3% after storage for 24 hours, 91.4% after storage for 48 hours, 90.7% after storage for 72 hours and 89.0% after storage for 96 hours. In addition, the bleaching baths of 5 times greater concentration are colourless and remain completely clear during storage. No incrustations or deposits form in the apparatus.

In contradistinction thereto, turbidity and precipitation occur even after 24 hours in bleaching baths of 5 times greater concentration and of similar composition and which contain water glass instead of the oligomers of formula (1). In addition, these unstabilised, 5-fold concentrated bleaching baths have a content of active oxygen of only 50.8% after storage for 24 hours, of 43.7% after storage for 48 hours, of 42.3% after storage for 72 hours, and of 41.3% after storage for 36 hours.

EXAMPLE 2

Unbleached cotton fabric is impregnated with an aqueous bleaching liquor which contains per liter or kg 10 ml (13.3 g) of 30% aqueous sodium hydroxide solution,
33 ml (37.4 g) of 35% aqueous hydrogen peroxide solution,
3 ml (4.1 g) of 35% aqueous sodium silicate solution,
0.4 g of the 25% aqueous surfactant solution of Example 1,
0.04 g of a 5% aqueous dispersion of silicone oil and
8.6 g of the 35% aqueous solution of oligomers obtained in (A).

The impregnated fabric is squeezed out to a pickup of 100%. 4 g of the further surfactant solution of Example 1 may also be used instead of the 25% aqueous surfactant solution. The impregnated fabric is rolled up and stored wet for 75 minutes at 90° C. The fabric is then rinsed and dried as described in Example 1. The bleached fabric has a degree of whiteness of 57 (unbleached fabric: −62) and is free of husks. It has excellent rewettability and a low ash content.

EXAMPLE 3

A washed cotton fabric is impregnated with an aqueous bleaching liquor which contains per liter or kg 8 g of sodium hydroxide,
50 ml (56.6 g) of 35% aqueous hydrogen peroxide solution,
6 g of a fluorescent whitening agent in the form of a 24% liquid formulation of the tetrasodium salt of 4,4′-bis-(4″-ethanolamino-6″-m-sulfoanilino-1″,3″,5″-triazin-2″-yl)aminostilbene-2,2′-disulfonic acid,
2.5 g of the 25% aqueous surfactant solution of Example 1,
0.25 g of a 5% aqueous dispersion of silicone oil and
5.2 g of the 35% aqueous solution of oligomers obtained in (A).

The impregnated fabric is squeezed out to a pickup of 100%. 2.5 g of the further surfactant solution of Example may also be used instead of the aqueous surfactant solution. The impregnated fabric is rolled up, packed airtight in plastic sheeting and stored moist and airtight for 24 hours at room temperature (15°–25° C.). The fabric is then thoroughly rinsed and dried as in Example 1. The bleached fabric has a degree of whiteness of 194 (unbleached fabric: −36). It is free from husks and has excellent rewettability and a low ash content.

EXAMPLE 4

Unbleached cotton fabric is impregnated with an aqueous bleaching liquor which contains per liter or kg 18 g of sodium hydroxide
50 ml (56.6 g) of 35% aqueous hydrogen peroxide solution,
1.5 g of the 25% aqueous surfactant solution of Example 1,
0.15 g of a 5% aqueous dispersion of silicone oil and
6 g of the 35% aqueous solution of oligomers obtained in (A).

The impregnated fabric is squeezed out to a pickup of 100%. Instead of the aqueous surfactant solution it is also possible to use 5 g of the further surfactant solution of Example 1. The impregnated fabric is rolled up and stored moist for 24 hours at room temperature (15°-25° C.). The fabric is subsequently rinsed and dried as in Example 1. The bleached fabric has a degree of whiteness of 57 (unbleached fabric: −62), is free from husks, and has excellent rewettability and a low ash content.

EXAMPLE 5

Unbleached cotton fabric is impregnated with an aqueous bleaching liquor which contains per liter or kg

- 18 g of sodium hydroxide,
- 50 ml (56.6 g) of 35% aqueous hydrogen peroxide solution,
- 5 g of sodium peroxidisulfate,
- 1.5 g of the 35% aqueous surfactant solution of Example 1,
- 0.15 g of a 5% aqueous dispersion of silicone oil and
- 6 g of the 35% aqueous solution of oligomers obtained in (A).

The impregnated fabric is squeezed out to a pickup of 100%. Instead of the aqueous surfactant solution it is also possible to use 5 g of the further surfactant solution of Example 1. The impregnated fabric is rolled up and stored moist for 24 hours at room temperature (15°-25° C.). The fabric is subsequently rinsed and dried as in Example 1. The bleached fabric has a degree of whiteness of 70 (unbleached fabric: −62), is free from husks and has excellent rewettability and a low ash content.

EXAMPLE 6

An unbleached blend of 35 parts of cotton and 65 parts of polyester is impregnated with an aqueous bleaching liquor which contains per liter or kg

- 12 g of sodium hydroxide,
- 40 ml (45.3 g) of 35% aqueous hydrogen peroxide solution,
- 5 g of the further surfactant solution of Example 1 and
- 6 ml of the 35% aqueous solution of oligomers obtained partially as sodium salt according to (D).

The blend is treated as described in Example 1. It has a degree of whiteness of 46 (unbleached fabric: 0).

EXAMPLE 7

Unbleached cotton fabric is impregnated with an aqueous bleaching liquor which contains per liter or kg

- 18 g of sodium hydroxide,
- 40 ml (45.3 g) of 35% aqueous hydrogen peroxide solution,
- 5 g of the further surfactant solution of Example 1 and
- 6 ml of the 35% aqueous solution of oligomers obtained partially as potassium salt according to (C).

The fabric is squeezed out to a pickup of 100%, then rolled up and stored moist for 24 hours at 20°-25° C. The fabric is subsequently rinsed and dried as in Example 1. The bleached fabric has a degree of whiteness of 24 (unbleached fabric: −63).

We claim:

1. A process for bleaching cellulosic textile fiber material with an aqueous peroxide-containing alkaline liquor, which process comprises applying to said material a liquor which is stabilized by addition of a water-soluble oligomer of the formula

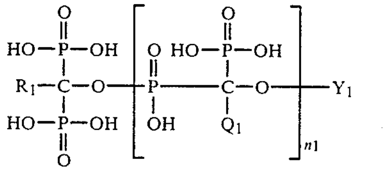

wherein $Y_1$ is hydrogen or —CO—$T_1$, each of $R_1$, $Q_1$ and $T_1$ is alkyl having 1 to 4 carbon atoms and $n_1$ is 1 to 16, or an alkali metal salt thereof, and subsequently storing the impregnated material in the moist state.

2. The process of claim 1, wherein $T_1$ is the same as $R_1$, $n_1$ is 1 to 14 and alkali metal is sodium or potassium.

3. The process of claim 1, wherein $Y_1$ is hydrogen, $Q_1$ and $R_1$ are the same and are either methyl or ethyl, $n_1$ is 1 to 12 and the alkali metal is potassium.

4. An aqueous alkaline peroxide-containing bleaching liquor for carrying out a process for bleaching cellulosic textile fiber material with an aqueous peroxide-containing alkaline liquor, which liquor is stabilized with an oligomer of the formula

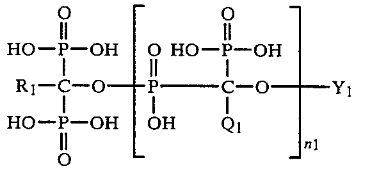

wherein $Y_1$ is hydrogen or —CO—$T_1$, each of $R_1$, $Q_1$ and $T_1$ is alkyl having 1 to 4 carbon atoms and $n_1$ is 1 to 16, or an alkali metal salt thereof.

5. The bleaching liquor of claim 4 which contains
(a) an alkali metal hydroxide,
(b) hydrogen peroxide and
(c) the oligomer of claim 4.

6. The bleaching liquor of claim 5 which further contains one or more of
(d) a peroxidisulfate,
(e) a wetting agent,
(f) an antifoaming or deaerating agent,
(g) a water-soluble alkali metal salt of a silicate and
(h) a fluorescent whitening agent.

7. A bleaching liquor according to claim 6, which contains sodium peroxidisulfate as component (d).

8. A bleaching liquor according to claim 6, which contains an anionic surfactant, a non-ionic surfactant or a mixture of both as component (e).

9. A bleaching liquor according to claim 8, which contains an adduct of ethylene oxide and a fatty alcohol, alkylsulfate salt, alkylbenzenesulfonic acid containing 12 to 22 carbon atoms in the alkyl moiety, or a mixture thereof, as component (e).

10. A bleaching liquor according to claim 6, which contains a silicone oil emulsion as component (f).

11. A bleaching liquor according to claim 6, which contains sodium silicate as component (g).

12. A bleaching liquor according to claim 6, which contains a sulfonated distyrylbiphenylstilbene or bis-triazinylaminostilbene derivative as component (h).

13. A bleaching liquor according to claim 6, which contains:

0.02 to 10% by weight of component (a), 0.05 to 12% by weight of component (b), 0.02 to 4% by weight of component (c), 0 to 5% by weight of component (d), 0 to 2.5% by weight of component (e), 0 to 0.05 by weight of component (f), 0 to 1.5% by weight of component (g) and 0 to 0.8% by weight of component (h).

14. A bleaching liquor according to claim 6, which contains 0.02% to 1.2% by weight of component (c), 0 to 0.4% by weight of component (e), 0 to 0.01% by weight of component (f) and 0 to 0.6% by weight of component (g).

15. A bleaching liquor according to claim 6, which contains 0.05 to 10.5% by weight of component (b) and 0 to 3% by weight of component (d).

16. A bleaching liquor according to claim 6, which contains 0.02 to 10% by weight of component (a), 0.05 to 12% by weight of component (b), 0.02 to 4% by weight of component (c), 0.005 to 0.2% by weight of component (e) and 0.0001 to 0.005% by weight of component (f).

17. A bleaching liquor according to claim 16, which contains 0.02 to 1.2% by weight of component (c).

18. A bleaching liquor according to claim 16, which contains 0.05 to 10.5% by weight of component (b) and 0.07 to 4% by weight of component (c).

19. A bleaching liquor according to claim 6, which contains, in addition to components (a), (b), (c), (e) and (f), 0.2 to 5% by weight of component (d), 0.05 to 1.5% by weight of component (g) and/or 0.1 to 0.8% by weight of component (h).

20. A bleaching liquor according to claim 16, which contains, in addition to components (a), (b), (c), (e) and (f), 0.2 to 5% by weight of component (d), 0.05 to 0.6% by weight of component (g) and/or 0.1 to 0.8% by weight of component (h).

21. A bleaching liquor according to claim 19, which contains 0.05 to 0.6% by weight of component (g).

22. A bleaching liquor according to claim 19, which contains 0.2 to 3% by weight of component (d).

23. A bleaching liquor according to claim 5, which contains sodium hydroxide as component (a)

* * * * *